(12) United States Patent
Cash

(10) Patent No.: US 7,195,433 B2
(45) Date of Patent: Mar. 27, 2007

(54) RETRACTABLE TIE DOWN AND METHOD OF USING

(75) Inventor: Michele A. Cash, Wichita, KS (US)

(73) Assignee: CNH America LLC, New Holland, PA (US)

(*) Notice: Subject to any disclaimer, the term of this patent is extended or adjusted under 35 U.S.C. 154(b) by 57 days.

(21) Appl. No.: 10/993,992

(22) Filed: Nov. 19, 2004

(65) Prior Publication Data
US 2006/0110231 A1   May 25, 2006

(51) Int. Cl.
B60P 7/08 (2006.01)

(52) U.S. Cl. .............. 410/100; 410/103; 410/116; 410/12

(58) Field of Classification Search .......... 410/12, 410/100, 103, 106, 110, 116; 24/265 CD, 24/68 CD; 248/499; 254/217, 223, 239
See application file for complete search history.

(56) References Cited

U.S. PATENT DOCUMENTS

| 2,946,563 | A | * | 7/1960 | Eaton ..................... 410/37 |
| 2,970,850 | A | | 2/1961 | Blunden |
| 4,382,736 | A | | 5/1983 | Thomas |
| 4,842,458 | A | | 6/1989 | Carpenter |
| 4,884,928 | A | | 12/1989 | Nachtigall et al. |
| 5,961,263 | A | | 10/1999 | Nunez |
| 6,059,499 | A | * | 5/2000 | Bird ..................... 410/103 |
| 6,200,079 | B1 | | 3/2001 | Little |
| 6,626,621 | B1 | | 9/2003 | Hugg |
| 6,709,208 | B1 | | 3/2004 | Lyrstrand et al. |
| 6,761,519 | B2 | | 7/2004 | Alderman |

* cited by examiner

Primary Examiner—Stephen Gordon
(74) Attorney, Agent, or Firm—Stephen A. Bucchianeri; John William Stader; Michael G. Harms

(57) ABSTRACT

A retractable tie down for tying a work vehicle down to a cargo vehicle is disclosed, the tie down including a retractor assembly fixed to the outer surface of a work vehicle; a belt with one end connected to the retractor assembly; and a coupling connected to the other end of the belt, wherein the belt has a length sufficient to reach the cargo vehicle.

17 Claims, 4 Drawing Sheets

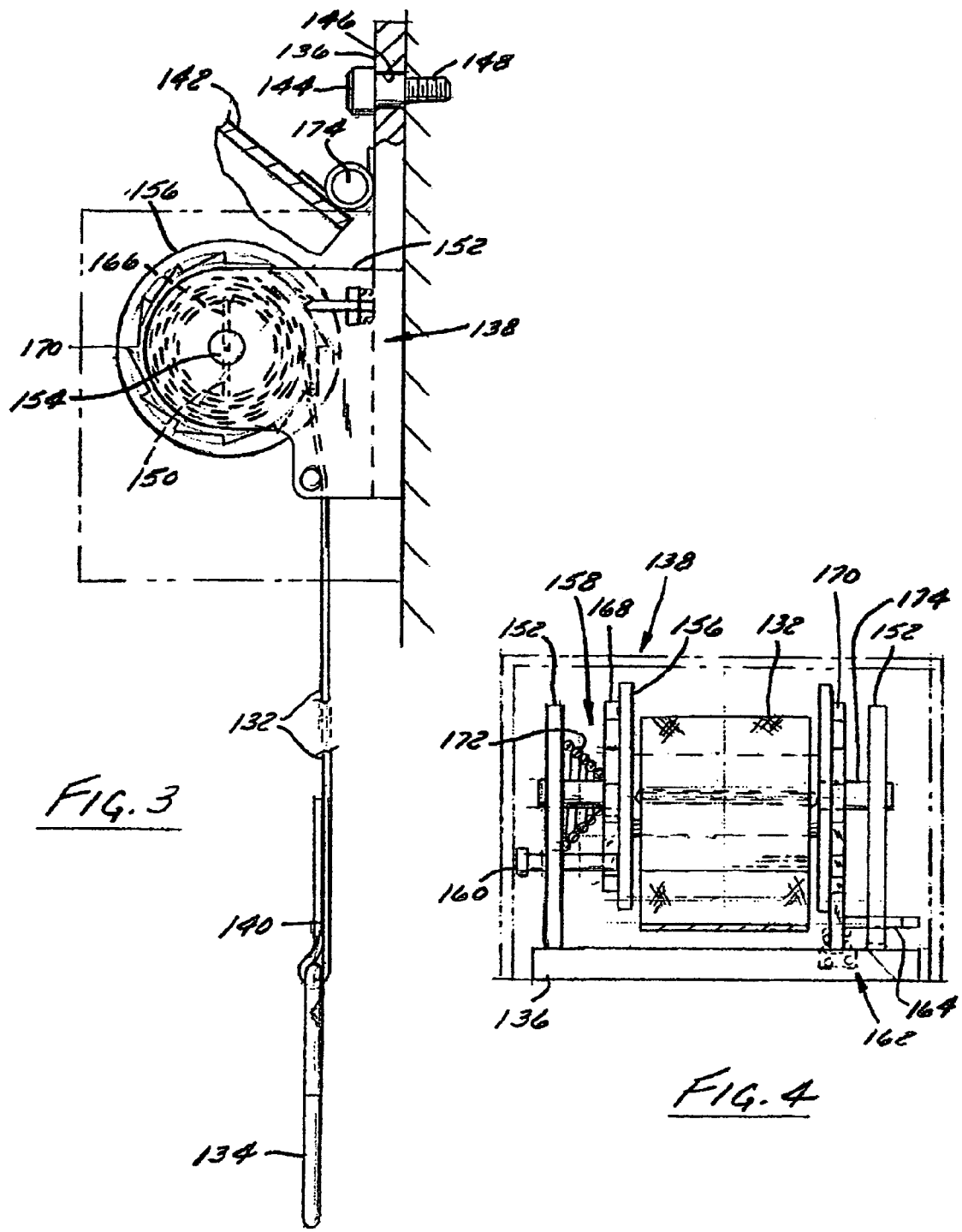

RETRACTABLE TIE DOWN AND METHOD OF USING

FIELD OF THE INVENTION

The invention relates generally to work vehicles, and more particularly to tractors or work vehicles that are transported on trailers.

BACKGROUND OF THE INVENTION

Skid steer loaders, tractors and other work vehicles typically work on job sites that are remotely located from the vehicle storage location or garage. The vehicles are loaded onto a trailer or truck bed for transportation between the storage location and the work site. Before transportation, one or more vehicles are driven onto the trailer and firmly secured to the trailer. A secure load is necessary in order that the vehicle does not fall off the trailer during transportation.

Securing vehicles to a trailer is usually performed with chains, and the process requires several steps. The loose chains are stored in a box when no load is being transported. The chains are removed from the storage box, untangled, and cleaned of mud and debris. One end of a chain is attached to the trailer. The chain is then pulled though openings in the chassis of the vehicle and the other end of the chain is attached to the trailer. The chain may have one or more hooks to make it easier to fasten them to the trailer. The chain is then tightened using a come-along, winch or other chain-tightening device. This process is repeated for each securing point. If the chains are tangled and mud-clogged, the load securing process is delayed. The chain attaching and tightening phases are also time-consuming, as chains slip during attachment and they are heavy and awkward to handle and thread through openings in the chassis of the vehicle.

The number of securing points is determined by the load stability, which is further influenced by the height, weight, and footprint of the load on the trailer. The transportation laws of the state or country may also proscribe the number and type of securing methods and points that are used. Currently, securing a load to at least four points is common. As more securing points are used, the time required for the operator to fully secure the load increases. Also, with more securing points required comes the need to carry and store more chains for attaching the vehicle.

Trailers typically have many locations along their sides to which chains may be secured. There are far fewer potential locations on the work vehicle itself around or through which chains may be looped or threaded. A typical work vehicle has only a few attachment points, and these are typically disposed low on the vehicle chassis around the tires. Often, there is no attachment point, or an attachment point that is not convenient, forcing the operators to, wrap the chains around vehicle axles, frame members or bumpers.

Attachment points on work vehicles are typically covered with mud, ice and other debris after a long work day. They have to be cleaned before chains are attached to or threaded through them. The operator typically gets quite dirty when threading the chains to attachment points or wrapping them around frame members. Worse, if no attachment points are within reach, or at the proper locations on the vehicle to secure the vehicle well, the operator must climb onto, over, or under the vehicle to secure the chains.

The chains are typically tightened by a winch or come along with one end fixed to the rail on the side of the trailer and the other end extending to the end of the chain that was just passed through the attachment point on the work vehicle. In another arrangement, a retractable device is mounted to the bed of a truck or trailer, and a strap is extended with a hook at the end that is attached to the trailer's cargo. The strap is tensioned by a tensioning mechanism located partway along the belt. This arrangement requires that the operator pull the belt tight and hold it while locking the tensioning device. Due to its location on the bed of the truck or trailer, the retractable device is prone to dirt and ice encrustation.

What is needed is a process of securing a work vehicle to a trailer that requires minimal steps. What is also needed is a retractable tie down mechanism that does not require looping or attaching to the vehicle during the load securing process. What is further needed is a retractable mechanism that is mounted to the vehicle, and is self-retracting such that the operator need only pull a hook out from the vehicle and attach the hook to the trailer.

SUMMARY OF THE INVENTION

In accordance with a first aspect of the invention, a retractable tie down is provided that includes a retractor assembly, a belt including a first end and a second end, wherein the first end is connected to the retractor assembly, and a coupling connected to the second end, wherein the retractor assembly is fixed to a work vehicle.

The belt may be selected from a group consisting of a fabric strap, a metal strap, a chain, and a cable. The retractor assembly may be spring loaded to retract the belt into the retractor assembly. The retractor assembly may further comprise a manual lock, the lock including a lock position and an unlock position, wherein in the lock position the lock prevents the belt from further extension from the retractor assembly, wherein in the unlock position the lock permits the belt to further extend from the retractor assembly. The retractor assembly may further comprise an internal locking device, wherein the internal locking device is configured to automatically engage the belt to prevent further extension of the belt, after the belt is extended and extension has been stopped by the operator. The retractor assembly may further comprise a manual release, the release including a release position and an unrelease position, wherein in the release position the internal locking device is disengaged from the belt, wherein in the unrelease position the internal locking device is not disengaged from the belt. The manual release may be biased to remain in the unrelease position. The retractable tie down may further comprise a cover, wherein the cover is pivotally attached to the retractor assembly, wherein the cover surrounds the retractor assembly. The cover may be spring loaded. The cover may have an open position and a closed position, wherein in the open position the operator can access the retractor assembly, the belt and the coupling, wherein in the closed position the operator can access the belt and the coupling, and wherein the cover is spring loaded and biased to remain in the closed position. The retractor assembly may be removably fixed to the work vehicle with at least one threaded fastener.

In accordance with a second aspect of the invention a method for securing a work vehicle onto a trailer using a plurality of retractable tie downs, wherein the plurality of tie downs are fixed to the work vehicle, the method comprising the steps of (a) driving the vehicle onto the trailer, (b) unreeling a free end of one or more tie downs from the work vehicle, (c) attaching the free end of one or more tie downs to the trailer and (d) tensioning one or more tie downs.

The work vehicle may be a skid steer loader including towers and loader arms. One or more tie downs may be fixed to one or more towers. One or more tie downs may be fixed to one or more loader arms. Step (d) may include a step of driving the vehicle forward or backward until the tie downs are tense. Step (d) may include a step of raising or lowering the loader arms until the tie downs are tense. The tie down may include a manual release and step (d) may include steps of activating the manual release, and automatically retracting the free end of the tie down onto a reel by a spring force. The tie down may include a manual release and step (b) may include steps of activating the manual release, and pulling a free end from a reel under spring tension. The tie down may include a manual lock, and step (c) may include a step of activating the manual lock to prohibit the free end from further extension.

In accordance with the third aspect of the invention, a retractable tie down for securely tying a work vehicle down to a cargo vehicle for transport, is provided the work vehicle being supportable on and transportable by the cargo vehicle, the tie down including: means for securing the work vehicle to the cargo vehicle; means for retracting the securing means, the retracting means being coupled to the work vehicle; and means for coupling the securing means to the cargo vehicle; wherein the means for retracting is fixed to an outer surface of the work vehicle and the means for securing has a length sufficient to reach the cargo vehicle.

The means for securing may be selected from a group consisting of a fabric strap, a chain and a cable. The means for retracting may include a means for coiling the securing means; and a tensioning means coupled to the coiling means to retract the securing means into the retracting means. The retracting means may also include a means for locking the securing means, the locking means being movable between a lock position and an unlock position; wherein in the lock position the locking means is configured to prevent the securing means from further extension from the retracting means; and wherein in the unlock position the locking means permits the securing means to further extend from the retracting means. The retracting means may also include a means for automatically locking the securing means; wherein the automatic locking means may be configured to automatically engage the securing means to prevent further extension of the securing means, after the operator (1) initially extends the securing means, and (2) subsequently stops extending the securing means the retracting means may further include a means for releasing the securing means, the releasing means being movable between a release position and an unrelease position; wherein in the release position the automatic locking means is disengaged from the securing means; and wherein in the unrelease position the automatic locking means is not disengaged from the securing means.

BRIEF DESCRIPTION OF THE DRAWINGS

FIG. 3 is a side view of the retractable tie down of FIG. 2 with the cover raised.

FIG. 4 is a bottom view of the retractable tie down of FIGS. 2–3.

DETAILED DESCRIPTION OF THE PREFERRED EMBODIMENT

Figure 1:
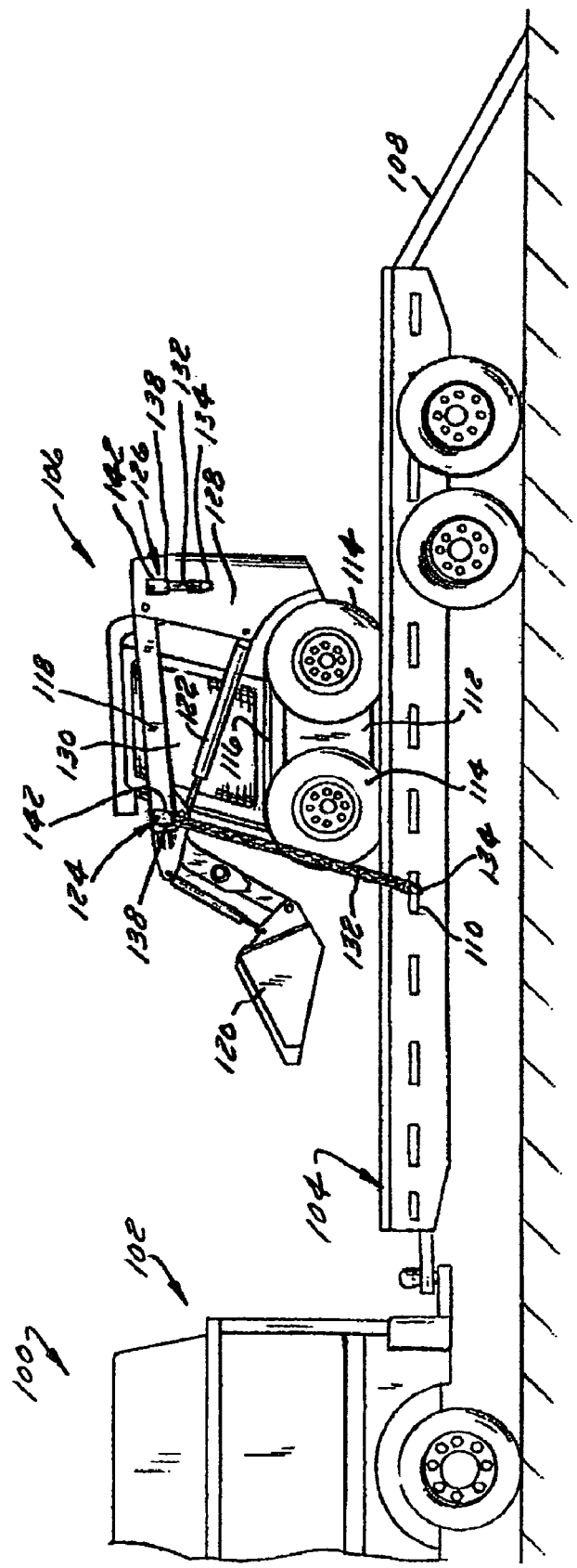
FIG. 1 is a view of a work vehicle having retractable tie downs in accordance with the present invention, showing the work vehicle on a trailer.

FIG. 1 shows a cargo vehicle 100 that comprises a tractor 102 coupled to a trailer 104. A work vehicle 106 (here shown as a skid steer loader) is mounted on trailer 104 for transport. Ramps 108 are coupled to the end of trailer 104. They are supported by the trailer at one end and are supported by the ground at the other end. They support work vehicle 106 as it is driven on to trailer 104.

Cargo vehicle 100 is configured to carry and transport work vehicle 106 from one job site to another, typically over the open road. In the preferred embodiment, shown here, cargo vehicle 100 is a tractor/trailer combination.

Trailer 104 has an elongate bed and a plurality of cargo securing fixtures 110 that are fixed on either side of the trailer bed. A series of these fixtures 110 extend the length of the bed on either side. In addition, several fixtures (not shown) are disposed on the upper surface of the flat bed of trailer 104. Fixtures 110 are preferably slots, as shown here.

Skid steer loader 106 includes a chassis 112, two left and two right wheels 114 supporting the chassis, left and right tracks 116 that wrap around the left and right wheels, left and right loader arms 118 that are pivotally coupled to the chassis, a bucket 120 that is pivotally coupled to the loader arms, and left and right loader arm lift cylinders 122 coupled to the loader arms.

Skid steer loader 106 also includes left front and right front retractable tie downs 124, and left rear and right rear retractable tie downs 126.

Chassis 112 includes two towers, posts or uprights 128 that are disposed on either side of, and at the rear of, operator compartment 130. Chassis 112 extends the length of loader 106 and provides a base on which the loader arms 118 and wheels 114 are mounted.

Two wheels 114 are disposed on either side of the vehicle in a fore-and-aft relation. Only the two wheels on the left side are illustrated in FIG. 1. The wheels on the right side of the vehicle are disposed identically but in mirror relation, since skid steer loader 114 is symmetric about its longitudinal axis.

Tracks 116 are continuous loops of metal links or are elastomeric belts that extend around the periphery of the wheels on each side of the vehicle 106.

Two loader arms 118 are disposed on either side of the vehicle 106, and are pivotally coupled to towers 128 at their rear ends. The front ends of loader arms 118 are coupled to bucket 120. Only the left loader arm 118 is shown in FIG. 1. The right loader arm is identically arranged but in mirror relation.

Bucket 120 is pivotally coupled to the loader arms 118 to be raised and lowered whenever the loader arms 118 are raised and lowered.

Loader arm lift cylinders 122 are hydraulic cylinders that are coupled to and between chassis 112 and loader arms 118 to lift the front of loader arms 118 with respect to the chassis 112. Only the left side loader arm cylinder 122 is shown. The right side loader arm cylinder 122 is identically arranged, but in mirror relation. Each cylinder 122 is pivotally connected at one end to the chassis 112 and is pivotally connected at the other end to a loader arm 118. Whenever the cylinders 122 extend and retract, the forward ends of the loader arms 118 raise and lower with respect to the chassis 112.

Tie downs 124, 126 are configured to secure skid steer loader 106 to the trailer 104 for transport over the road. Left front and right front tie downs 124 are fixed to the front of the left and right loader arms 118, respectively. Left rear and right rear tie downs 126 are fixed to left and right towers 128, respectively.

Only the left side tie downs are illustrated herein. The right side tie downs and the left side tie downs are identically constructed and arranged. The only difference between the left side and right side tie downs is that the right side tie downs are disposed on the right side of the vehicle in mirror relation to the left side tie downs.

Figure 2:
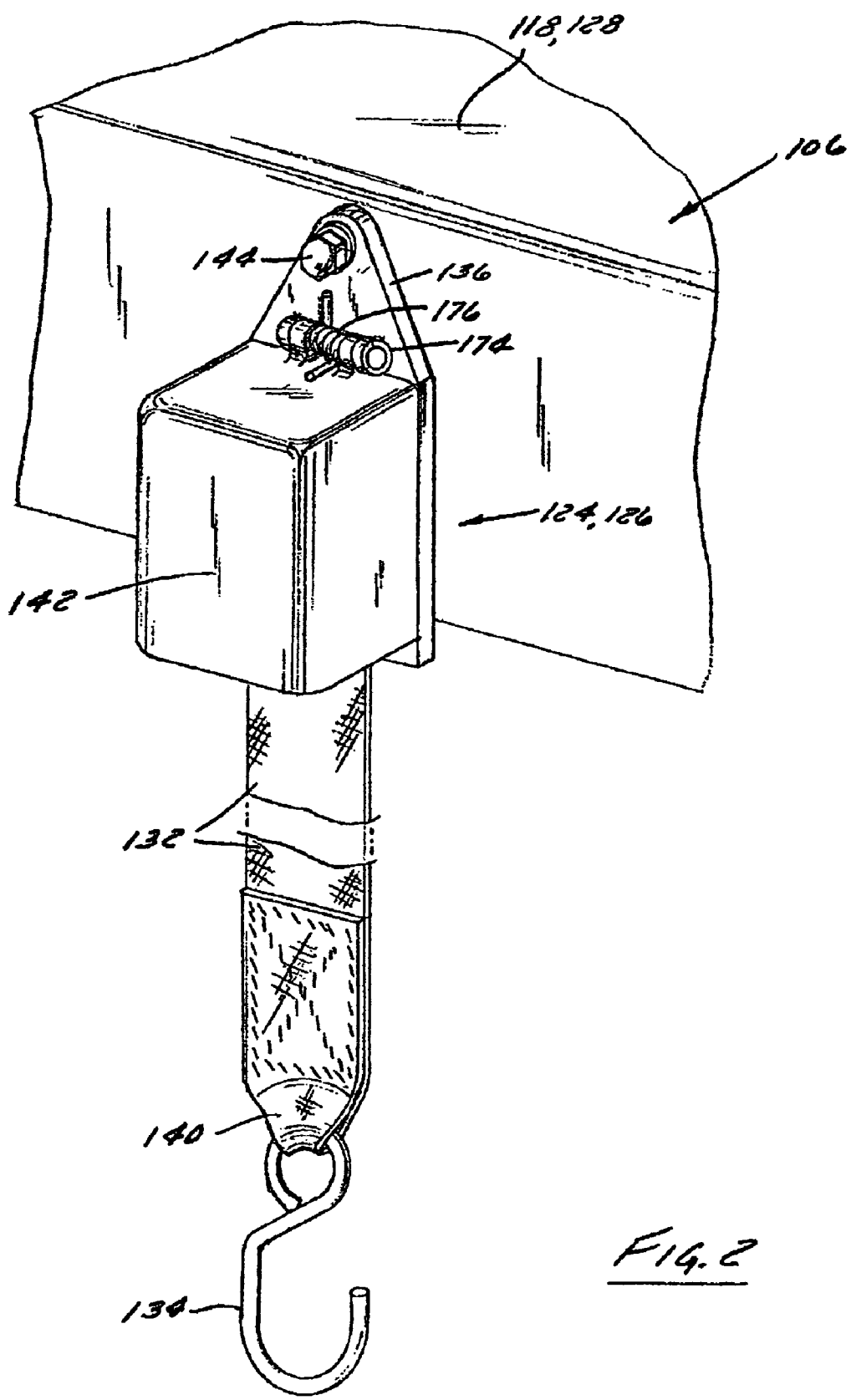
FIG. 2 is a perspective view of a retractable tie down, fixed to the side of the work vehicle, with its cover closed.

Tie downs 124, 126 are identically constructed and are shown in more detail in FIGS. 2–4. Each tie down 124, 126 includes a retractable belt 132 that is configured to attach at its free, lower end to trailer 104 of cargo vehicle 100. The free end of belt 132 includes a coupling 134 that is configured to be fixed to cargo securing fixtures 110 of trailer 104.

Tie downs 124, 126 are preferably located at the four corners of vehicle 106 as shown here. A similar placement will work for many four or six wheel work vehicles, such as tractors, backhoes, trucks, and off-road recreational vehicles. This placement allows a wide separation between the cargo securing fixtures 110 to which the tie downs are attached. By attaching a vehicle to widely separated cargo securing fixtures 110, the vehicle 106 travels better over the road and is less likely to shift unexpectedly.

Tie downs 124, 126 are preferably located high on the vehicle, as shown herein. A high position keeps them clean, and makes it easy for the operator to reach the belts when he is attaching a vehicle 106 to trailer 104.

FIGS. 2–4 illustrate a preferred embodiment of tie downs 124, 126. The particular tie down illustrated in FIGS. 2–4 is left front tie down 124, which is also shown in FIG. 1. Since all of the tie downs on the vehicle are constructed identically to left front tie down 124, they are not separately described herein. The description of left front tie down 124 applies equally to all the other tie downs 124, 126 on vehicle 106.

Left front tie down 124 include a mounting plate 136 fixed to skid steer vehicle 106, a retractor assembly 138 fixed to the mounting plate, a belt 132 fixed to (and extending from) retractor assembly 138 at one end, and coupling 134 that is fixed to the free end 140 of the belt. Tie down 124 also includes a cover 142 that extends around and encloses retractor assembly 138, and a fastener 144 for attaching tie down 124 to skid steer vehicle 106.

Mounting plate 136 is the base to which the other components of tie down 124 are attached. Plate 136 has a through hole 146 at its upper end. Fastener 144 extends through hole 146 and is attached to left loader arm 118. Fastener 144 is preferably a bolt, and left loader arm 118 preferably has a threaded mating hole 148 to which fastener 144 is attached. In the case of rear tie downs 126, fastener 144 is attached to the towers at the rear of the skid steer loader.

Retractor assembly 138 is fixed to mounting plate 136 and is configured to selectively extend, retract, and store belt 132.

Retractor assembly 138 includes a housing 152 that supports the other components of assembly 138, a spindle 154 that is fixed to housing 152, a reel 156 that is supported for rotation on spindle 154, a retracting device 158 coupled to reel 156 to tension and wind belt 132 on reel 156, a manual lock 160 coupled to housing 152 to prevent the extension or retraction of belt 132, an automatic lock 162 for preventing the extension of belt 132, and a manual release 164 for releasing automatic lock 162.

Housing 152 of retractor assembly 138 is fixed to mounting plate 136. The other components of retractor assembly 138 are attached to housing 152.

Spindle 154 extends across the inside of the housing 152 and is fixed at its ends to housing 152. Spindle 154 extends through the hollow core of reel 156 and supports the reel for free rotation within the housing.

Reel 156 is mounted for rotation on the spindle 154. Reel 156 rotates on spindle 154 to wind and unwind belt 132. Reel 156 has a slot 166 to which end 150 of belt 132 is fixed. One end of reel 146 has first teeth 168 that engage manual lock 160 when it is moved to its lock position, and second teeth 170 on the other end of the reel that engage automatic lock 162.

Retracting device 158 is provided to wind and tension belt 132 onto reel 156, thereby retracting belt 132 into retractor assembly 138. Retracting device 158 includes a spring 172 mounted on the spindle. Spring 172 keeps tension on reel 156, which, in turn, tensions belt 132. One end of spring 172 is connected to the side of the reel 156. The other end of the spring is connected to housing 152. A suitable alternative retracting device may be seen in U.S. Pat. No. 4,842,458, which is incorporated herein by reference for all that it teaches regarding an alternative retracting device. Spring 172 will retract belt 132 into the retractor assembly 138 if it is not otherwise prevented, such as by the operator, by manual lock 160 or by automatic lock 162.

Manual lock 160 is provided to lock belt 132. Manual lock 160 locks reel 156 in place, which prevents belt 132 from being in either withdrawn from or rewound into retractor assembly 138. Manual lock 160 has two positions, and unlock position and a lock position. When manual lock 160 is pressed toward reel 156, it engages first teeth 168 on reel 156. In this position, reel 156 cannot rotate about spindle 154. When manual lock 160 is withdrawn from reel 156, it disengages with first teeth 168 and permits reel 156 to rotate.

Automatic lock 162 is contained inside the housing 152 and is configured to automatically lock belt 132 when belt 132 is extended and the belt's extension is stopped. In use, the operator extends belt 132 to a preferred length, attaches coupling 134 to a cargo securing fixture 110 on trailer 104, then allows or otherwise causes retracting device 158 to take the slack out of belt 132, reeling any excess belt length back into retractor assembly 138. Automatic lock 162, functions like an automobile seat belt, locking belt 132 when it begins to retract and preventing it from being extended until manual release 164 is activated. An alternative automatic lock that may be used in place of automatic lock 162 is shown in U.S. Pat. No. 2,825,581, which is incorporated by reference herein for all that it teaches regarding an alternative automatic lock.

Manual release 164 is provided to release automatic lock 162 and belt 132 when it is moved to its release position. Manual release 164 permits belt 132 to be withdrawn from retractor assembly 138. Manual release 164 has a release position and an unrelease position. In the other release position it permits automatic lock 162 to again engage belt 132.

In use, when the operator pushes manual release 164 to its release position, manual release 164 responsively defeats, overrides and disengages automatic lock 162, permitting the operator to further extend belt 132 from retractor assembly 138 typically by pulling on belt 132 against the tension of the spring. When the operator moves manual release 164 to its unrelease position, automatic lock 162 functions normally, locking belt 132 after its subsequent extension stops and retraction begins, just as before. In one embodiment of the invention, manual release 164 is spring loaded, overriding automatic lock 162 for only so long as the operator holds manual release 164 in its release position, and manual release 164 automatically returns to its unrelease position when the operator stops holding it. In another embodiment of the invention, manual release 164 does not automatically return to its unrelease position, but stays in its release position until manual moved back to the unrelease position. In yet another embodiment, no manual release is provided and automatic lock 162 is only released when belt 132 is withdrawn substantially completely into retractor assembly 138. This arrangement is familiar to passengers in automobiles who use seat belts.

In the preferred embodiment, however, manual release 164 is preferably biased toward its unrelease position, so that the operator has to hold the manual release in the release position once the automatic lock engages if he wishes to further extend belt 132.

Belt 132 is preferably a fabric strap. Alternatively, belt 132 may be a cable, cord or chain.

Coupling 134 is preferably a steel hook. It may be covered with rubber or plastic for better gripping. Alternatively, coupling 134 may be a D-ring, a C-ring, a chain link, an eye, or a fabric loop formed in the end of belt 132.

Cover 142 encloses retractor assembly 138 and protects it and belt 132 from the elements. Cover 142 includes a hinge 174 and a hinge spring 176. Cover 142 is generally box-shaped, having five walls and one open side. The open side faces mounting plate 136 and retractor assembly 138. Hinge 174 is attached to mounting plate 136, and is pivotally connected to cover 142. Hinge spring 176 is configured to bias cover 142 toward mounting plate 136.

Figure 5:
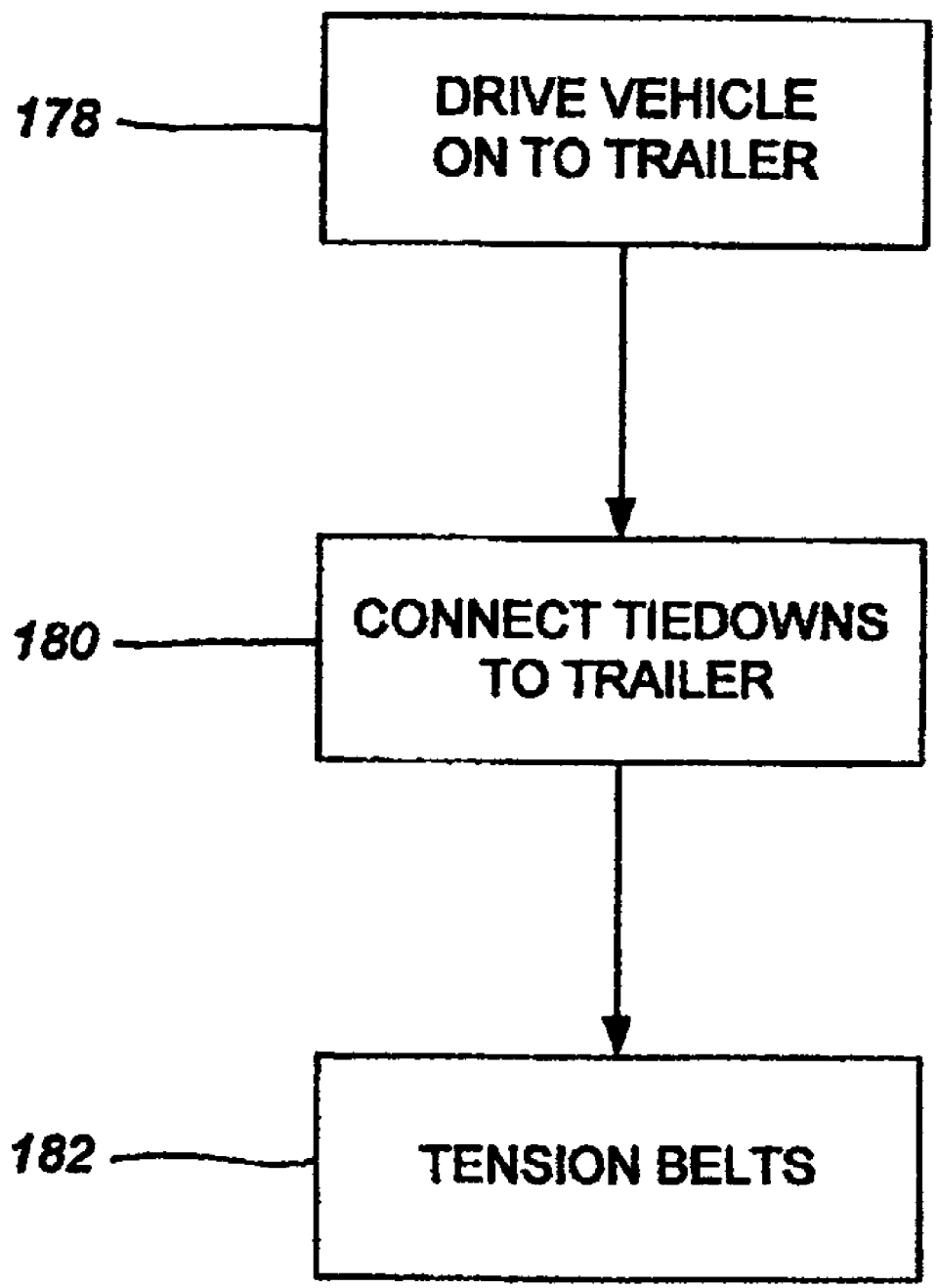
FIG. 5 is a flow chart showing a method of using the tie downs to secure a work vehicle to a cargo vehicle in accordance with the present invention.

FIG. 5 demonstrates a method of securing the work vehicle to trailer 104 for transport. The work vehicle is first driven onto trailer 104. The operator then extends belts 132 from the four tie downs 124, 126 and attaches the belts to fixtures 110. The operator then tensions the belts. Once the belts are tensioned appropriately, the operator then drives a cargo vehicle 100 to the next job site.

In step 178, the operator drives vehicle 106 up ramps 108, onto trailer 104 of cargo vehicle 100, to an appropriate central position on trailer 104.

Vehicle 106 is preferably positioned such that at least two front fixtures 110 are disposed forward of the vehicle and forward of tie downs 124 to permit belts 132 from tie downs 124 to be extended downward, forward, and away from the vehicle by the operator to the at least two fixtures 110 to which tie downs 124 are coupled.

Similarly, vehicle 106 is preferably positioned such that at least two rear fixtures 110 are disposed behind the vehicle and behind tie downs 126 to permit belts 132 from tie downs 126 to be extended downward, backward and away from the vehicle by the operator to the at least two fixtures 110 to which tie downs 126 are coupled.

Vehicle 106 is also preferably positioned such that at least two left side fixtures 110 are disposed on the left side of the vehicle such that left side tie downs 124, 126 can be extended by the operator downward, outward, to the left, and away from vehicle 106 to left side fixtures 110.

Vehicle 106 is further preferably positioned such that at least two right side fixtures 110 are disposed on the right side of the vehicle such that right side tie downs 124, 126 can be extended by the operator downward, outward, to the right, and away from vehicle 106 to right side fixtures 110.

In step 180, the operator climbs out of the operator compartment of tractor 102, or out of the operator compartment 130 of vehicle 106 after having driven vehicle 106 onto trailer 104. The operator grasps the free end of a first tie down 124, 126, and pulls that tie down toward the appropriate cargo-securing fixture 110. Reel 156 of that tie down unwinds under spring tension provided by spring 172 until coupling 134 of the tie down reaches the desired fixture 110 on trailer 104. The operator then attaches coupling 134 to desired fixture 110 and releases belt 132. Spring 172 then retracts any slack in belt 132, winding it around reel 156. Automatic lock 162 engages, preventing belt 132 from being further withdrawn from retractor assembly 138.

Should the operator wish to reposition this tie down, after it has been tensioned, he presses manual release 164, withdraws additional slack from retractor assembly 138, and unhooks coupling 134 from the desired fixture 110.

Alternatively, if the operator is satisfied with the location of the first tie down, he repeats the belt-extending and coupling-attaching steps of the two previous paragraphs for the remaining three tie downs.

The tie downs may be initially locked with manual lock 160 in their retracted positions when the operator drives vehicle 106 onto trailer 104. If they are locked, the operator first switches manual lock 160 to its unlock position, releasing belts 132, before withdrawing belt 132 from retractor assembly 138 and connecting coupling 134 to fixture 110.

If the operator wants additional security, he can alternatively engage manual lock 160 of the tie downs after they have been coupled to fixtures 110.

In step 182, the operator tensions the belts of the tie downs in any manner, for example (1) by releasing them and having them rewind automatically into retractor assembly 138, (2) by manually tightening them, (3) by raising the loader arms, or (4) by driving the vehicle forward or backward to apply a tension to the belts.

Steps 180 and 182 can be intermixed. The operator need not attach all the tie downs to the trailer, and subsequently tension all the tie downs.

For example, in one method the operator can attach tie downs 126 to fixtures 110 located behind vehicle 106, then release the tie downs for automatic rewind into retractor assembly 138, or alternatively drive vehicle 106 forward, thereby taking the slack out of belts 132 extending from tie downs 126.

Alternatively, the operator could attach tie downs 124 to fixtures 110 located forward of vehicle 106, then release the tie downs for automatic rewind into retractor assembly 138, or alternatively drive vehicle one of six backward, thereby taking the slack out of belts 132 extending from tie downs 124, or alternatively raise loader arms 118 tensioning both of tie downs 124 simultaneously.

Once rear tie downs 126 are attached to their respective fixtures 110 and tensioned, the operator can subsequently attach front tie downs 124 and tension them. Similarly, once front tie downs 124 are attached to their respective fixtures 110 and tensioned, the operator can subsequently attach rear tie downs 126 and tension them.

As yet another alternative, the operator can successively attach and tension each tie down 124, 126 individually, such as by retracting (and thereby tensioning) each tie down in turn as soon as it is coupled to its fixture 110.

The particular order and combination of steps will depend on the type of work vehicle 106, the type of cargo vehicle 100, the location and type of fixtures 110 on trailer 104, and the locations of tie downs 124, 126 on work vehicle 106, as well as operator preference and skill level.

FIG. 1 illustrates work vehicle 106 oriented in the same direction as cargo vehicle 100, with the front of both vehicles facing to the left. In an alternative process of attaching work vehicle 106 to trailer 104, vehicle 106 can be backed up ramps 108 such that vehicle 106 faces in the opposite direction as cargo vehicle 100.

If the work vehicle 106 is loaded on to trailer 104 of cargo vehicle 100 backwards, with its front end facing the rear of the cargo vehicle and its rear end facing the front of the cargo vehicle, the preferred tie down attachment points would be reversed. Belts 132 from tie downs 126 would preferably extend forward (with respect to cargo vehicle 100) to fixtures 110, and belts 132 from tie downs 124 would extend backward (with respect to cargo vehicle 100) to fixtures 110.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

For example, there are alternative methods, structures, and configurations to the preferred embodiments such as using a chain, cable, or cord for a belt, rather than a reinforced flat fiber strap. The method of tightening the tie down may include an intermediate winch or manual tensioning device located partway along the belt or at either end. As a further example, the tie downs may be permanently fixed to the work vehicle, such as by welding or riveting. Further, the retractor assembly may be mounted directly to the work vehicle, rather than being fixed to the intermediate mounting plate 136 that, in turn, is fixed to the work vehicle.

Cargo securing fixtures 110 can be a slot, as shown herein, but may also include a pin, ring, rail, aperture, or hook.

Retracting device 158 can use a different actuator in place of spring 172, such as a hand crank, a winch, or an electric motor. A spring-loaded automatic retracting device is, however, the preferred embodiment due to its simplicity and ease of use.

Manual lock 160 is shown herein as a pushbutton lock. In an alternative configuration, other structures may be used to activate the lock, such as levers, toggles, knobs, or solenoids.

Cargo vehicle 100 may be configured as two or more units pivotally coupled together such as the tractor and trailer illustrated herein. For example, instead of towing a single trailer 104, tractor 102 can be coupled to (and tow) two or more trailers 104. Alternatively, cargo vehicle 100 can be a single unitary structure, such as a flatbed truck, enclosed truck, or car carrier.

Tractor 102 can be a common tractor for a tractor-trailer rig, as shown here. Alternatively, it may be an automobile, pickup truck, dump truck, or other vehicle configured for towing a trailer.

Trailer 104 is preferably the dual axle trailer 104 shown herein, but may alternatively be a flatbed trailer, enclosed trailer, or single or multilevel "car carrier" trailer, for example.

Tie downs 124, 126 may be fixed to other portions of work vehicle 106, however. For work vehicles 106 other than skid steer loaders, the tie downs may be mounted to the frame, chassis, blade, bucket, excavator, backhoe, or other strong rigid component of the work vehicle.

Smaller work vehicles 106 may only require two tie downs to adequately secure them to trailer 104. Larger (or longer) work vehicles may require six or more tie downs to adequately secure them to trailer 104.

I claim:

1. A retractable tie down for securely tying a work vehicle down to a cargo vehicle for transport, said work vehicle being supportable on and transportable by said cargo vehicle, the tie down comprising:
   a retractor assembly;
   a belt including a first end and a second end, wherein the first end is connected to the retractor assembly; and
   a coupling connected to the second end;
   wherein the retractor assembly is fixed to an outer surface of the work vehicle and the belt has a length sufficient to reach the cargo vehicle; and
   further wherein the work vehicle is a skid steer loader and the retractor assembly is fixed to a loader arm or a lower of the skid steer loader.

2. The retractable tie down of claim 1, wherein the belt is selected from a group consisting of a fabric strap, a chain and a cable.

3. The retractable tie down of claim 1, wherein the retractor assembly comprises:
   a reel coupled to the belt; and
   a spring coupled to the reel to automatically retract the belt into the retractor assembly.

4. The retractable tie down of claim 1, wherein the retractor assembly further comprises:
   a manual lock, said lock being movable between a lock position and an unlock position;
   wherein in said lock position said lock prevents said belt from further extension from the retractor assembly; and
   wherein in said unlock position said manual lock permits said belt to further extend from the retractor assembly.

5. The retractable tie down of claim 1, wherein the retractor assembly further comprises:
   an automatic lock;
   wherein said automatic lock is configured to automatically engage the belt to prevent further extension of the belt, after an operator (1) initially extends the belt, and (2) subsequently stops extending the belt.

6. The retractable tie down of claim 5, wherein the retractor assembly further comprises:
   a manual release, said release being movable between a release position and an unrelease position;
   wherein in said release position the automatic lock is disengaged from the belt; and
   wherein in said unreleased position the automatic lock is not disengaged from the belt.

7. The retractable tie down of claim 6, wherein said manual release is biased to remain in the unreleased position.

8. The retractable tie down of claim 1, further comprising:
   a cover;
   wherein said cover is pivotally attached to the retractor assembly; and
   wherein said cover surrounds the retractor assembly.

9. The retractable tie down of claim 8, wherein the cover is spring loaded about the pivotal attachment in such a manner as to tend to keep the cover surrounding the retractor assembly.

10. The retractable tie down of claim 9, wherein the cover has an open position and a closed position;
   wherein in the open position an operator can access the retractor assembly, the belt and the coupling;
   wherein in the closed position an operator can access the belt and the coupling;
   wherein the cover is biased to remain in the closed position.

11. The retractable tie down of claim 1, wherein the retractor assembly is removably fixed to the work vehicle with at least one threaded fastener.

12. A retractable tie down for securely tying a skid steer loader down to a cargo vehicle, for transport, said skid steer loader being supportable on and transportable by said cargo vehicle, the tie down comprising:
   means for securing the skid steer loader to the cargo vehicle;
   means for retracting the securing means, said retracting means being coupled to the skid steer loader; and
   means for coupling the securing means to the skid steer loader;
   wherein the means for retracting is fixed to an outer surface of the skid steer loader and the means for securing has a length sufficient to reach the cargo vehicle.

13. The retractable tie down of claim 12, wherein the means for securing is selected from a group consisting of a fabric strap, a chain and a cable.

14. The retractable tie down of claim 12, wherein the means for retracting comprises:
   a means for coiling the securing means; and
   a tensioning means coupled to the coiling means to retract the securing means into the retracting means.

15. The retractable tie down of claim 12, wherein the retracting means further comprises:
   a means for locking said securing means, said locking means being movable between a lock position and an unlock position;
   wherein in said lock position said locking means being configured to prevent said securing means from further extension from the retracting means; and
   wherein in said unlock position said locking means permits said securing means to further extend from the retracting means.

16. The retractable tie down of claim 12, wherein the retracting means further comprises:
   a means for automatically locking the securing means;
   wherein said automatic locking means is configured to automatically engage the securing means to prevent further extension of the securing means, after an operator (1) initially extends the securing means, and (2) subsequently stops extending the securing means.

17. The retractable tie down of claim 16, wherein the retracting means further comprises:
   a means for releasing said securing means, said releasing means being movable between a release position and an unrelease position;
   wherein in said release position the automatic locking means is disengaged from the securing means; and
   wherein in said unreleased position the automatic locking means is not disengaged from the securing means.

* * * * *